US012670562B2

(12) United States Patent
Delbracio et al.

(10) Patent No.: US 12,670,562 B2
(45) Date of Patent: Jun. 30, 2026

(54) SYSTEMS, APPARATUS, AND METHODS FOR REMOVING BLUR IN AN IMAGE

(71) Applicant: Google LLC, Mountain View, CA (US)

(72) Inventors: Mauricio Delbracio, Sunnyvale, CA (US); Peyman Milanfar, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 295 days.

(21) Appl. No.: 18/251,663

(22) PCT Filed: Nov. 15, 2021

(86) PCT No.: PCT/US2021/059321
§ 371 (c)(1),
(2) Date: May 3, 2023

(87) PCT Pub. No.: WO2022/104180
PCT Pub. Date: May 19, 2022

(65) Prior Publication Data
US 2024/0013350 A1     Jan. 11, 2024

Related U.S. Application Data

(60) Provisional application No. 63/114,314, filed on Nov. 16, 2020.

(51) Int. Cl.
*G06T 5/00*          (2024.01)
*G06T 5/20*          (2006.01)
*G06T 5/70*          (2024.01)
*G06T 5/73*          (2024.01)

(52) U.S. Cl.
CPC ................. *G06T 5/73* (2024.01); *G06T 5/20* (2013.01); *G06T 5/70* (2024.01)

(58) Field of Classification Search
CPC .... G06T 5/73; G06T 5/20; G06T 5/70; G06T 2207/20182
See application file for complete search history.

(56) References Cited

U.S. PATENT DOCUMENTS

| | | |
|---|---|---|
| 2008/0025627 A1 | 1/2008 | Feeman et al. |
| 2009/0190851 A1 | 7/2009 | Chien et al. |
| 2012/0155785 A1 | 6/2012 | Banner et al. |
| 2014/0023291 A1 | 1/2014 | Lin |

(Continued)

FOREIGN PATENT DOCUMENTS

| | | |
|---|---|---|
| CN | 102750679 A | 10/2012 |
| CN | 103093436 A | 5/2013 |

(Continued)

OTHER PUBLICATIONS

Kenny Kal Vin Toh et al., "Locally Adaptive Bilateral Clustering for Image Deblurring and Sharpness Enhancement", IEEE, pub. Sep. 19, 2011 (Year: 2011).*

(Continued)

*Primary Examiner* — Mekonen T Bekele
(74) *Attorney, Agent, or Firm* — McDonnell Boehnen Hulbert & Berghoff LLP

(57)          ABSTRACT

Systems, apparatus, and methods are presented for deblurring images. One method includes receiving an image and estimating blur for the image. The method also includes applying a deblurring filter to the image and reducing halo from the image.

20 Claims, 4 Drawing Sheets

(56) References Cited

U.S. PATENT DOCUMENTS

| | | | | |
|---|---|---|---|---|
| 2017/0236256 A1 | | 8/2017 | Bucaille et al. | |
| 2017/0357871 A1* | | 12/2017 | Zhai | G06V 10/50 |

FOREIGN PATENT DOCUMENTS

| | | | | | |
|---|---|---|---|---|---|
| CN | 104376564 B | * | 4/2018 | | G06T 7/13 |
| CN | 108629751 A | * | 10/2018 | | G06T 3/4053 |
| CN | 110415193 A | | 11/2019 | | |
| CN | 111652811 A | | 9/2020 | | |
| JP | 2004-226532 A | | 8/2004 | | |
| JP | 2008-59461 A | | 3/2008 | | |
| JP | 2015-170307 A | | 9/2015 | | |
| KR | 10-2014-0045370 A | | 4/2014 | | |
| KR | 10-2020-0008251 A | | 1/2020 | | |
| WO | 2012/170462 A2 | | 12/2012 | | |

OTHER PUBLICATIONS

John Immerkær, "Use of Blur-Space for Deblurring and Edge-Preserving Noise Smoothing", IEEE Transactions on Image Processing, vol. 10, No. 6, Jun. 2001. (Year: 2001).*
Kiyotaka Shimizu et al., "Necessary Conditions for Min-Max Problems and Algorithms by a Relaxation Procedure", IEEE Transactions on Automatic , vol. AC-25, No. 1, Feb. 1980. (Year: 1980).*
Shi et al., "Just Noticeable Defocus Blur Detection and Estimation", IEEE Xplore, pub. 2015 (Year: 2015).*
Kumar , "Deblurring of motion blurred images using histogram of oriented gradients and geometric moments" Signal Processing Image Communication, pub 2017 (Year: 2017).*
Toh et al. , "Locally Adaptive Bilateral Clustering for Image Deblurring and Sharpness Enhancement", IEEE, pub. Sep. 19, 2011 (Year: 2011).*
Kumar, "Deblurring of motion blurred images using histogram of oriented gradients and geometric moments" Signal Processing Image Communication, pub 2017 (Year: 2017) (Year: 2017).*
Toh et al., "Locally Adaptive Bilateral Clustering for Image Deblurring and Sharpness Enhancement", IEEE, pub. Sep. 19, 2011 (Year: 2011) (Year: 2011).*
Milanfar, Peyman., "Rendition: Reclaiming what a black box takes away", arxiv.org, Cornell University Library, 2018, 30 pages.
Matlin et al., "Removal of haze and noise from a single image", Computational Imaging X, SPIE, 2012, 8296 (1), 12 pages.
Zhu et al., "Restoration for weakly blurred and strongly noisy images", Applications of Computer Vision (WACV), IEEE, 2011, pp. 103-109.
Murakami et al., "Motion Deblurring using PSF Predicted from Multiple One-Dimensional Edges," IEICE Technical Report, vol. 108, No. 453, CAS2008-132, pp. 177-182, Mar. 2009.
Fergus et al., "Removing camera shake from a single photograph," International Conference on Computer Graphics and Interactive Techniques, ACM SIGGRAPH 2006 Papers, Boston, Massachusetts, ACM, New York, NY, USA, Jul. 1, 2006, pp. 787-794.
Pham, "Asymmetric Recursive Gaussian Filtering for Space-Variant Artificial Bokeh," 2018 Digital Image Computing: Techniques and Applications (DICTA) IEEE, Dec. 10, 2018, pp. 1-8.

* cited by examiner

300

RECEIVE AN IMAGE ⎯ 302

ESTIMATE A BLUR KERNAL FOR THE IMAGE ⎯ 304

APPLY A DEBLURRING FILTER TO THE IMAGE ⎯ 306

REDUCE HALO FROM THE IMAGE ⎯ 308

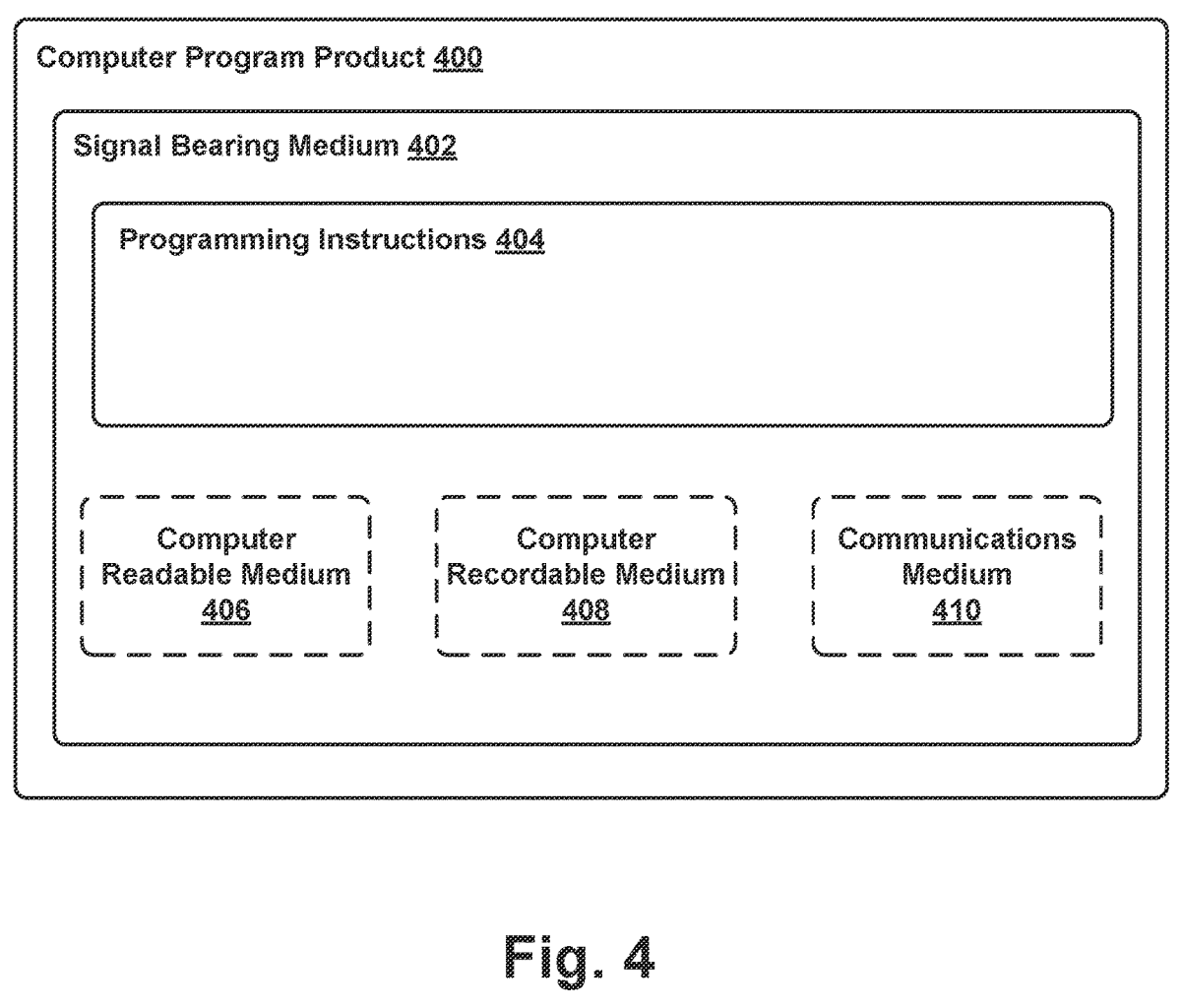

Computer Program Product 400

Signal Bearing Medium 402

Programming Instructions 404

| Computer Readable Medium 406 | Computer Recordable Medium 408 | Communications Medium 410 |

Fig. 4

SYSTEMS, APPARATUS, AND METHODS FOR REMOVING BLUR IN AN IMAGE

RELATED APPLICATIONS

This application is the US national phase under 35 U.S.C. § 371 of International Application No. PCT/US2021/059321, filed Nov. 15, 2021, which claims the benefit of U.S. Provisional Application No. 63/114,314, filed Nov. 16, 2020, the contents of which is hereby incorporated by reference in its entirety.

BACKGROUND

Unless otherwise indicated herein, the materials described in this section are not prior art to the claims in this application and are not admitted to be prior art by inclusion in this section.

Recent advances in image capture technology have led to a proliferation of camera devices, and in turn, to a large increase in the number of digital photos produced by users. However, many cameras, such as the cameras in cellular and smart phones, may not have sophisticated mechanical or electrical focusing and stabilizing mechanisms. As a result, many captured images may be blurry, leading to decreased user satisfaction with the images.

Removing blur from images has been a longstanding problem in image processing and computational photography. Blur may be caused by numerous factors, such as the camera's focus not being correctly adjusted (e.g., out-of-focus), objects appearing at different depths, or when relative motion between the camera and the scene occurs. Even in perfect conditions, there may be unavoidable physical limitations that introduce blur. For example, light diffraction due to the finite lens aperture, integration of the light in the sensor and other possible lens aberrations may introduce blur leading to a loss of details. Additionally, other components of the image processing pipeline itself, such as demosaicing and denoising, may introduce blur.

Image blur may be generally modeled as a linear operator acting on a sharp latent image. If the linear operator is shift-invariant, then the blurring operation amounts to a convolution with a blur kernel. It is frequently assumed that the captured image will have additive noise on top of the blur. This implies, $$v=k*u+n$$

where v is the captured image, u the underlying sharp image, k the convolution with an unknown blur kernel, and n is additive noise.

Image deblurring is conventionally addressed by the approach of blind deconvolution. Most blind deconvolution methods involve a two-step process. In the first step, a blur kernel is estimated. This may be done by assuming a sharp image model, using a variational framework. In the second step, a non-blind deconvolution algorithm is applied. Image noise may severely hinder both steps. Thus, a significant problem of blind deconvolution approaches is that even in the case where the blur kernel may be perfectly known, the presence of noise and model mismatch may lead to artifacts.

BRIEF SUMMARY

Embodiments of the present disclosure provide systems, methods, and apparatus for removing blur in images. It should be appreciated that the systems, methods, and apparatus of the present disclosure can be implemented in numerous ways. Several embodiments of the present disclosure are described below.

In one aspect, a method for deblurring an image is described. The method includes receiving an image and estimating blur for the image. The method also includes applying a deblurring filter to the image and reducing halo from the image.

In another aspect, the present application describes an apparatus comprising a memory and one or more processors. The one or more processors may be configured to receive an image and estimate a blur for the image. The one or more processor may also be configured to apply a deblurring filter to the image and reduce halo from the image.

In still another aspect, a non-transitory computer-readable medium storing instructions is disclosed that, when the instructions are executed by one or more processors, causes the one or more processors to perform operations. The operations may include receiving an image and estimating a blur for the image. The operations also include applying a deblurring filter to the image and reducing halo from the image.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF DRAWINGS

Reference will now be made to the accompanying figures and flow diagrams, which are not necessarily drawn to scale, and wherein:

FIG. 4 is a schematic diagram of a computer program, according to an example implementation.

DETAILED DESCRIPTION

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

Figure 1:
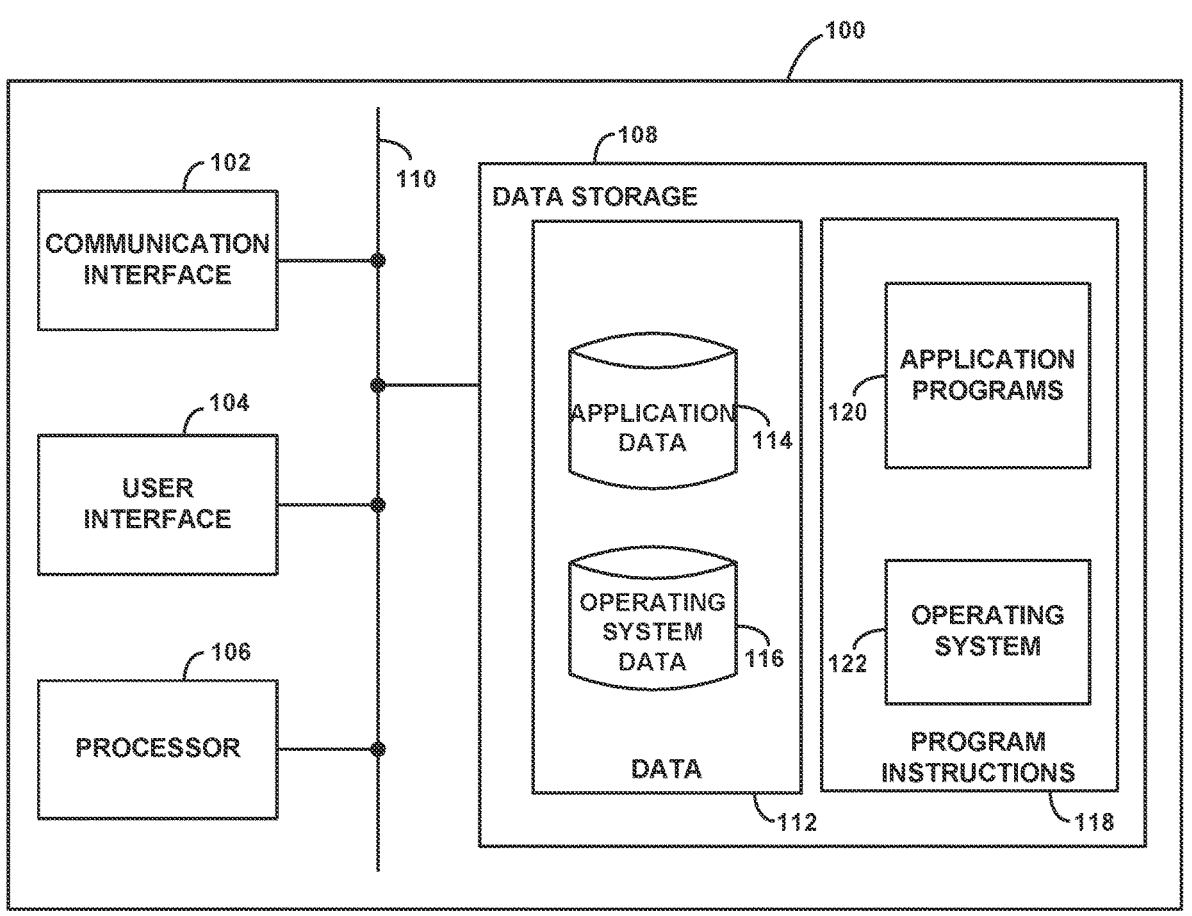
FIG. 1 depicts an illustration of a computing device, according to an example embodiment.

The following embodiments describe systems, apparatus, and methods for removing blur in images. Referring now to the drawings, FIG. 1 depicts an illustration of a computing device 100 for removing blur in an image, according to an example implementation. The computing device 100 may be a camera, a mobile device, a personal computer system, a desktop computer, a laptop, a notebook, a netbook computer, a mainframe computer system, a handheld computer, a workstation, a network computer, a set top box, a mobile phone, a video game console, a handheld video game device, an application server, a storage device, a wearable computing device (e.g., a pair of eye glasses equipped with a camera, a head-mounted display, and/or an augmented reality display), a peripheral device such as a switch, modem, router, or in general any type of computing or electronic device, etc. As shown in FIG. 1, the computing device 100 may include a communication interface 102, a user interface 104, a processor 106, data storage 108, all of which may be communicatively linked or coupled together by a system bus, network, or other connection mechanism 110.

The communication interface 102 of the computing device 100 may function to allow the computing device 100 to communicate, using analog or digital modulation, with other devices, access networks, and/or transport networks. Thus, the communication interface 102 may facilitate circuit-switched and/or packet-switched communication, such as POTS communication and/or IP or other packetized communication. For instance, the communication interface 102 may include a chipset and antenna arranged for wireless communication with a radio access network or an access point. Also, the communication interface 102 may take the form of a wireline interface, such as an Ethernet, Token Ring, or USB port. The communication interface 102 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over the communication interface 102. Furthermore, the communication interface 102 may comprise multiple physical communication interfaces (e.g., a Wifi interface, a BLUETOOTH® interface, and a wide-area wireless interface).

The user interface 104 of the computing device 100 may function to allow the computing device 100 to interact with a human or non-human user, such as to receive input from a user and to provide output to the user. The user interface 104 may include input components such as a keypad, keyboard, touch-sensitive or presence-sensitive panel, computer mouse, trackball, joystick, microphone, still camera and/or video camera. The user interface 104 may also include one or more output components such as a display screen (which, for example, may be combined with a touch-sensitive panel), CRT, LCD, LED, a display using DLP technology, printer, light bulb, and/or other similar devices, now known or later developed. The user interface 104 may also be configured to generate audible output(s), via a speaker, speaker jack, audio output port, audio output device, earphones, and/or other similar devices, now known or later developed. In some embodiments, the user interface 104 may include software, circuitry, or another form of logic that can transmit data to and/or receive data from external user input/output devices. Additionally or alternatively, the computing device 100 may support remote access from another device, via the communication interface 102 or via another physical interface (not shown).

In some examples, the user interface 104 may also serve as a viewfinder for still camera and/or video camera functions supported by the computing device 100. Additionally, the user interface 104 may include one or more buttons, switches, knobs, and/or dials that facilitate the configuration and focusing of a camera function and the capturing of images. In some implementations, some or all of these buttons, switches, knobs, and/or dials are implemented as functions on a touch or proximity sensitive panel.

The processor 106 of the computing device 100 may comprise one or more general purpose processors (e.g., microprocessors) and/or one or more special purpose processors (e.g., digital signal processors (DSPs), graphics processing units (GPUs), floating point units (FPUs), network processors, or application-specific integrated circuits (ASICs)). The processor 106 may be capable of executing program instructions 118 (e.g., compiled or non-compiled program logic and/or machine code) stored in the data storage 108 to carry out the various functions described herein.

The data storage 108 of the computing device 100 may include one or more volatile and/or non-volatile storage components, such as magnetic, optical, flash, or organic storage, and may be integrated in whole or in part with the processor 106. The data storage 108 may include removable and/or non-removable components. Further, the data storage 108 may include a non-transitory computer-readable medium, having stored thereon program instructions that, upon execution by computing device 100, cause the computing device 100 to carry out any of the methods, processes, techniques, and/or functions disclosed in this specification and/or the accompanying drawings. The execution of the program instructions 118 by the processor 106 may result in the processor 106 using data 112.

By way of example, the program instructions 118 may include an operating system 122 (e.g., an operating system kernel, device driver(s), and/or other modules) and one or more application programs 120 (e.g., address book, email, web browsing, social networking, and/or gaming applications) installed on computing device 100. Similarly, the data 112 may include application data 114 and operating system data 116. The operating system data 116 may be accessible primarily to the operating system 122, and the application data 114 may be accessible primarily to one or more of application programs 120. The application data 114 may be arranged in a file system that is visible to or hidden from a user of the computing device 100.

The application programs 120 may communicate with the operating system 122 through one or more application programming interfaces (APIs). These APIs may facilitate, for instance, the application programs 120 reading and/or writing the application data 114, transmitting or receiving information via the communication interface 102, receiving or displaying information on the user interface 102, and so on.

In some vernaculars, the application programs 120 may be referred to as "apps" for short. Additionally, the application programs 120 may be downloadable to the computing device 100 through one or more online application stores or application markets. However, the application programs 120 can also be installed on the computing device 100 in other ways, such as via a web browser or through a physical interface (e.g., a USB port) on the computing device 100.

The computing device 100 may also include camera components (not shown). The camera components may include, but are not limited to, an aperture, shutter, recording surface (e.g., photographic film and/or an image sensor), lens, and/or shutter button. The camera components may be controlled at least in part by software executed by the processor 106. Further, the camera components may include multiple camera systems, which each include an aperture, shutter, recording surface lens, image sensor, processor, and/or shutter button.

Figure 2:
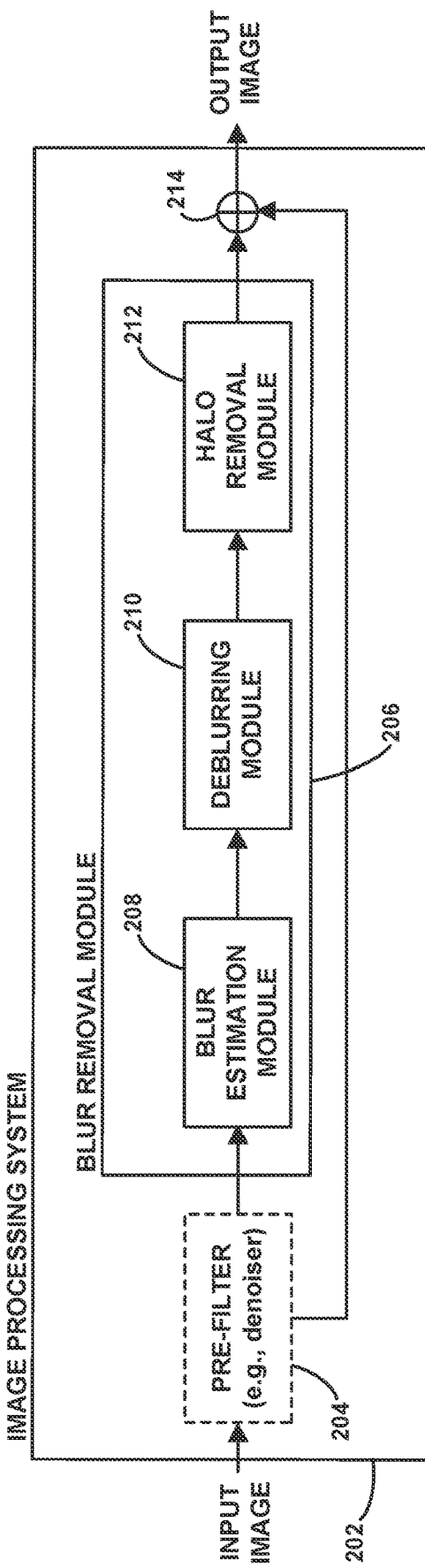
FIG. 2 is a simplified block diagram of an image processing system, in accordance with an example embodiment.

FIG. 2 illustrates an example simplified block diagram of an image processing system or engine 202 for performing a blur removal process, according to one embodiment. The image processing system 202 may be implemented by or incorporated in a camera, a mobile device, a personal computer system, a desktop computer, a laptop, a notebook, a netbook computer, a mainframe computer system, a handheld computer, a workstation, a network computer, a set top box, a mobile phone, a video game console, a handheld video game device, an application server, a storage device, a wearable computing device (e.g., a pair of eye glasses equipped with a camera, a head-mounted display, and/or an augmented reality display), a peripheral device such as a switch, modem, router, or in general any type of computing or electronic device, etc. The image process system 202 may include various components, including a pre-filter or pre-processing module 204 (e.g., a denoising engine) and a blur removal module 206. The pre-filter module 204 may be an optional component (as indicated by the dotted outlines). For example, in some cases, the pre-filter module 204 (e.g., denoising engine) can be included in or used by the image processing system 202, and in other cases it can be omitted from or not used by the image processing system 202.

The components of the image processing system 202 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or can be implemented using computer software, firmware, or any combination thereof, to perform the various operations described herein. For example, the pre-filter module 202 and the blur removal module 206 may be stored in a computer-readable storage medium and executed by a processor of a computer system to perform the functions described herein. While the image processing system 202 is shown to include certain components, one of ordinary skill will appreciate that the image processing system 202 can include more or fewer components than those shown in FIG. 2. For example, the image processing system 202 may also include, in some instances, one or more memory devices (e.g., RAM, ROM, cache, buffer, and/or the like) and/or processing devices that are not shown in FIG. 2.

The image processing system 202 may receive an input image. The input image may be processed by the pre-filter module 202 to reduce or remove noise from the image. For example, the pre-filter module 204 can denoise the input image to generate a noise-reduced image. The pre-filter module 204 may include a non-local means filtering to reduce or remove noise from the input image. In other embodiments, the pre-filter module 204 may use a denoising neural network (e.g., a convolutional neural network, or other suitable neural network) to remove or reduce the noise from the input image. In such cases, the denoising neural network can be trained by inputting multiple noisy versions of images together with clean versions of the same images. Using the known inputs (noisy images) and the known outputs (clean images), the denoising neural network can tune its parameters (e.g., weights, biases, etc.) to be able to output clean images (the noise-reduced images) from noisy images that are input into the neural network. The resulting noise-reduced images can have no noise or may still have some noise, but the noise may be greatly reduced by the denoising neural network.

In some embodiments, the pre-filter module 204 can use other noise removal techniques to generate a noise-reduced image. In some examples, the noise removal techniques can include AIM Engine Denoise-Upscale-Downscale, median filtering, Anisotropic diffusion, geometric mean filtering, local means filtering, bilateral filtering, block-matching and three-dimensional (3D) filtering, local pixel grouping, filtering using a Wiener filter, any other suitable noise filtering technique, and/or any combination thereof.

Further, the pre-filter module 204 may perform operations for normalizing the image and determining the dynamic range of the image. For example, the pre-filter module 204 may normalize the brightness of the input image such that processed images have predefined contrast and standard deviation values. The pre-filter module 204 may additionally determine whether to perform the blur detection processing based on dynamic range and noise in the image. If the image has too much noise or too low of a dynamic range, the pre-filter module 204 may be configured to discard the image. If the pre-filter module determines that the blur detection processing may be performed, further processing steps may be performed by the blur removal module 206 to remove the blur from the image.

The blur removal module 206 of the image processing system 202 estimates blur of the image, removes the blur of the input image, and reduces halos. The blur removal module 206 may include a blur estimation module 208 of the blur removal module 206, a deblurring module 210, and a halo remover module 212. The blur estimation module 208 may be configured to estimate the blur of the image. The blur estimate module 208 may receive an input image or may receive a noise-reduced image from the pre-filter module 204. The blur estimation module 208 may analyze the received image to determine the extent of blurriness. If the received image has too much blur, the blur estimate module 208 may discard the received image as further described below. However, if the received image has mild-blur (e.g., the blur is below a threshold), the blur estimation module 208 may perform operations on the received image to estimate the blur.

In one embodiment, the blur estimation module 208 may model the blur of the received image based on parameters of a Gaussian function. It may assumed that the blur of the image is uniform over the entire image and that the image blur can be modeled by the linear model $v=k*u+n$, where v is the captured image, u the underlying sharp image, k the convolution with an unknown blur kernel, and n is additive noise. Since the blur estimation module 208 may be designed to process mild-blur (e.g., blur below a threshold) where the blur kernel is expected to be small, a parametric model may be used for the blur kernel. In one implementation, the blur kernel may be modeled with an anisotropic Gaussian function, specified with three parameters: $\sigma_0$, the standard deviation of the main axis, $\rho$, the ratio between the standard deviations in the principal axis and the orthogonal one, and $\theta$, the angle between the major axis and the (horizontal) x-axis. Thus, the Gaussian blur kernel at pixel (x,y) may be computed by the following equation:

$$k(x,y;[a,b;b,c])=Z \exp(-(ax^2+2bxy+cy^2))$$

where:

$$a = \frac{\cos^2(\theta)}{2\sigma_0^2} + \frac{\sin^2(\theta)}{2\rho^2\sigma_0^2}, \; b = \frac{\sin(2\theta)}{4\sigma_0^2}\left(\frac{1}{\rho^2}-1\right), \; c = \frac{\sin^2(\theta)}{2\sigma_0^2} + \frac{\cos^2(\theta)}{2\rho^2\sigma_0^2}$$

and Z is a normalization factor so as its area is equal to one. Thus, estimating the blur, amounts to estimating three parameters ($\sigma_0$, $\rho$, and $\theta$).

In order to estimate a blur kernel for a particular image using the blur kernel model, the following assumptions may be made about the image gradient distribution of the image.

For example, it may be assumed that the maximum value of the image gradient in any direction of a sharp natural image may be substantially constant and independent of the image. It may also be assumed that if a sharp image is affected by Gaussian blur, the blur level at the direction of the principal (orthogonal) axis may be in linear relation to the inverse of the maximum image gradient in that (orthogonal) direction. Based on these assumptions, the maximum magnitude of the image derivative may be estimated at all possible orientations and the minimum value may be determined among them. This leads to the following equation:

$$f_\theta = \min_\psi \max_x |\nabla_\psi f(x)| \quad (9)$$

where f(x) is an arbitrary input image. Then, $$\sigma_0 = \frac{c}{f_\theta}, \sigma_1 = \frac{c}{f_{\theta_\perp}},$$

where c is a coefficient controlling the assumed linear relation between the gradient feature and the level of blur.

The estimation of the image gradient at any given image pixel may introduce additional blur (since some sort of interpolation may be needed). This may be in addition to the image blur already included in the image. Assuming the blur estimation introduces an isotropic Gaussian blur of $\sigma_b$, then the total blur of the image will be approximately $$\sigma_{0_T}^2 = \sigma_b^2 + \sigma_0^2$$

(due to the semigroup property of Gaussian function). This leads to:

$$\sigma_0 = \sqrt{\frac{c^2}{f_\theta^2} - \sigma_b^2} \; \sigma_1 = \sqrt{\frac{c^2}{f_{\theta_\perp}^2} - \sigma_b^2}, \quad (10)$$

where c and $\sigma_b$ are two parameters that need to be calibrated.

In one implementation, the parameters c and $\sigma_b$ may be calibrated as follows: Given a set of sharp high quality images, a number of Gaussian blurry images (e.g., K=1000) may be simulated, by randomly sampling the blur space and the image set. The Gaussian blur kernels may be generated by sampling random values for $\sigma_0 \in [0.3, 4]$ and $\rho \in [0.15, 1]$. Additive Gaussian white noise of $\sigma_n=3.0$ may be added to each simulated blurry image. For each of the blurry images, the gradient features and the maximum and minimum values may be sampled according to equation (9) above. The parameters c and $\sigma_b$ may be estimated by equation 10 above. In other embodiments, other fitting schemes may be used (e.g., robust L1 fitting, Hubber loss, weighted least squares, etc.).

In one example, the blur estimate module 204 may be implemented using an algorithm to perform the Gaussian blur estimation procedure as follows: Let image u, q-quantile, n angles, (a, b), ($\sigma_{max}$,$\sigma_{min}$), ($\rho_{max}$, $\rho_{min}$) be the inputs and the parameters ($\sigma_0$, $\rho$, $\theta$) be the outputs 1. Normalize input image.
   $u=(u-u_{min})/(u_{max}-u_{min})$, where $u_{max}$ and $u_{min}$ are computed as robust maximum and minimum taking quantiles q=0.0001 and 1−q.
2. Compute gradient features.
   Compute image gradient $(u_x,u_y)$ and then the directional derivative at $n_{angles}(6)$ uniformly covering [0 to pi). This may be done by computing $u_\psi=u_x \cos(\psi)-u_y \sin(\psi)$. For each $u_\psi(x, y)$, compute $f_\psi=\max |u_\psi|$.
3. Interpolate gradient features.
   Cubically interpolate $(f_{\psi 1}, \psi_1), \ldots, (f_{\psi n}, \psi_n)$ in a super-resolved grid (n samples) and estimate the minimum and the respective angle. Let $(f_0, \theta_0)$ be set to the minimum value, and $(f_1, \theta_{0\perp})$ direction oi to the feature value at the orthogonal. direction $\theta_{0\perp}$.
4. Estimate $\sigma_0$ and $\sigma_1$ using the regression model (e.g., equation 10).
5. Validate parameters.
   a. $\sigma_0$=clamp ($\sigma_0$, $\sigma_{min}$, $\sigma_{max}$) and $\sigma_1$=clamp ($\sigma_1$, $\sigma_{min}$, $\sigma_{max}$).
   b. Define $\rho=\sigma_1/\sigma_0$
   c. $\rho$=clamp($\rho$, $\rho_{min}$,$\rho_{max}$)
6. Return ($\sigma_0$, $\rho$, $\theta 0$).

Further, the blur estimate module 208 may compute a blur score for the received image that indicates the extent of blurriness. For example, the image received by the blue estimate module 208 may be analyzed and a blur score is calculated. A higher blur score can be indicative of greater blur in the image. Given the estimated Gaussian blur parameters, the blur-score may be estimated or computed in a number of ways. In one example, the blur score may be determined by computing the standard deviation of the isotropic Gaussian blur that has the same covariance matrix determinant as the estimated Gaussian. This amounts to define as blur-score the radius of the circle having the same area as the ellipse determined by $\sigma_0$ and $\sigma_1$. That is, $$\text{blur score}=\sqrt{\sigma_0\sigma_1}=\sigma_0\sqrt{\rho}.$$

The blur score may be compared to a predetermined threshold. If the blur score is less than the predetermined threshold, it may be determined that the image is of good/ acceptable quality and may be further processed by the deblurring module 208. If on the other hand, it is determined that the blur score is greater than the threshold, the image may be discarded.

Referring still to FIG. 2, the deblurring module 208 of the image processing module 202 receives the image from the blur estimation module 206 and deblurs the image. The deblurring module 208 may apply a deblurring filter (e.g., a linear restoration filter) to the image to reduce the blur. The deblurring filter may be constructed based on the inverse of the blur estimated by the blur estimation module 206. By combining different iterations of the blur kernel on the blurry image, the inverse of the blur may be approximated as follows: Let K be the convolution operator with the blur kernel k, then if $\|I-K\|<1$ under some matrix norm, $K^{-1}$ the inverse of K exists and, $$K^{-1} = \sum_{i=0}^{\infty} (I - K)^i.$$

The geometric series of the above equation may converge if it is assumed circular boundary conditions for the convolution, then the eigenvectors of the matrix K are the Fourier modes. This implies that $(I-K)^i=F^H(I-D)^iF$, where F is the Fourier basis, $F^H$ is the Hermitian transpose of F and D is a diagonal matrix with the eigenvalues of K. Thus, the series converges if the eigenvalues of K are in $D=\{z\in C: |z-1|<1\}$. However, if the blur is non-invertible, i.e., an eigenvalue is zero, the power series may converge to the pseudo-inverse of K. In the case of blur filters that conserve the overall luminosity, a reasonable hypothesis is that $k(x)\geq 0$, and $\int k(x)dx=1$. This implies that $|\hat{k}(\xi)|\leq 1$.

In one example, the inverse can be approximated with a polynomial filter using the blur kernel as a base. For instance, if we truncate the power series having an order of 3, the polynomial approximate inverse of K may be represented by:

$$K_{ord3}^{inv} = 4I - 6K + 4K^2 - K^3. \tag{3}$$

Further, general polynomials may be used having the equation:

$$p(K) = \sum_{i=0}^{d} a_i K^i, \tag{4}$$

where the order d and coefficients $(a_0, \ldots, a_d)$ can be designed to amplify or attenuate differently depending on how the blur is affecting a particular component.

Assuming that the blur filter $k(x)$ is symmetric $k(x)=k(-x)$ and has non-negative Fourier coefficients, the Fourier coefficients $\hat{k}(\xi)$ of the filter k may be in [0, 1]. The Fourier coefficients of the polynomial filter may be related with the ones from the base filter through the same polynomial, that is, $$\widehat{p(k)}(\zeta) = \sum_{i=0}^{d} a_i \hat{k}(\zeta). \tag{5}$$

The polynomial filters can be analyzed in the Fourier domain. Based on the interval $I=[0,1]$ mapped by the polynomial, it may be determined how the attenuated Fourier components may be amplified or attenuated by the polynomial filter. If the polynomial filter is applied to an image v that has been affected by the same base blur k as the one used to the polynomial filter, the equation becomes $$p(K)\upsilon=p(K)K\alpha+p(K)n, \tag{6}$$

where it may become evident that there is a trade-off between inverting the blur, i.e. $p(K)$ $K\approx Id$. and avoiding noise n amplification, i.e., $p(K)$ $n\approx 0$. Thus, the polynomials may be designed to (i) invert the effect of blur in the frequencies that have not been significantly attenuated, and (ii) avoid amplifying frequencies significantly affected by the blur.

In one example, a polynomial filter may be built based on: $p(K)K\approx Id$, when K is close to the identity, or in terms of the polynomial, $p(x)\approx 1/x$ if $x\approx 1$. Note that a Taylor expansion of $1/x$ at $x=1$ of degree d, leads to the polynomial filter from truncating Equation 2 to degree d. As such, this polynomial substantially approximates the inverse, but significantly amplifies noise, particularly in the most attenuated components. To approximate the inverse and controlling the amplification of the noise, a polynomial may be designed with a degree d, that is, d+1 coefficients may be defined. The inverse may be approximated by forcing the polynomial to have equal derivatives at the ones of the inverse function at $x=1$. This is done up to order d−2, $$p^{(i)}(x=1)=(-1)^i i!, \tag{7}$$

$i=1, \ldots, d-2$ and based on the additional constraint that $p(x=1)=1$. The remaining two degrees of freedom may be left as design parameters. The mid-frequencies may be amplified by controlling $p^{(d-1)}(x=1)=\alpha$, and the noise may be amplified by controlling $p(x=0)=b$ at the frequencies that are completely attenuated by the blur. This example of d+1 linear equations leads to a (closed-form) family of polynomials, pol-d-a-b. The value of $\alpha$ and b should vary in a range close to the one given by the truncated power series, i.e., $\alpha=(-1)^d d!$, and $b=d+1$. The polynomial filter family may be presented with a degree d=3 as follows:

$$p_{3,\alpha,b}(x)=(\alpha/2-b+2)x^3+(3b-\alpha-6)x^2+(5-3b+\alpha/2)x+b. \tag{8}$$

The above analysis assumes that the blur filter $k(x)$ is symmetric and additionally may not have negative Fourier coefficients. One way to circumvent this may be by applying a correction filter $ck(x)$ to the image so that total filter is $h=ck*k$, but now h has the desired properties (non-negative Fourier coefficients).

In one example, a flipped kernel may be used, i.e., $ck(x)=k(-x)$, which leads to $h(x)$ having real non-negative Fourier coefficients $\hat{h}(\xi)=|\hat{k}(\xi)|^2$. However, the correction filter may introduce additional blur to the image, making the deblurring problem more difficult. An alternative approach may be to design the correction filter to compensate for the phase but without introducing any additional attenuation of the spectra. This can be done by the pure phase filter, $\hat{c}_k(\xi)=\overline{\hat{k}(\xi)}/|\hat{k}(\xi)|$. As such, the procedure may be implemented as follows: given k and the blurry image v, $v_c=ck*v$, and $h=ck*k$ may be computed. Then, the blurry image $v_c$ can be deblurred using a Polynomial filter with base filter h.

Referring again to FIG. 2, the halo removal module 212 may receive a deblurred image from the deblurring module 210 and reduce halos (e.g., halo artifacts) in the image. Halos may be generated due to mis-estimation of blur or more generally due to model mismatch. Halos may appear at pixels where the blurry image and restored image have opposite gradients (gradient reversal).

In one example, let $v(x)$ be the blurry image and $v^-(x)$ the de-blurred one. Pixels with gradient reversal are those where $M(x)=-\nabla v(x)\cdot\nabla\overline{v}(x)$ is positive. A new image $u(x)$ may be computed that may be formed as a per pixel convex combination of the input image $v(x)$ and the deblurred $v^-(x)$ by the equation:

$$u(x)=z(x)\upsilon(x)+(1-z(x))\overline{\upsilon}(x). \tag{12}$$

Further, the example may be designed to avoid halos in the final image u(x), but keep as much as possible of the deblurred $\bar{v}(x)$. If z(x) does change too fast, then $$\nabla u(x) = o(x)\nabla u(x) + (1-o(x))\nabla \bar{u}(x) \tag{13}$$

To avoid halos on the final image, $\nabla v(x) \cdot u(x) > 0$ may be required. Then, for pixels, where M(x)>0, the equation:

$$z(x) \le \frac{M(x)}{\|\nabla v(x)\|^2 + M(x)},$$

will lead to a new image that may not have any gradient reversal halos introduced in the deblurring step. To keep as much as possible of the deblurred image (i.e., z(x), $\in$ [0, 1] should be as small as possible. Then the final image is generated by adopting $$z(x) = \max\left(\frac{M(x)}{\|\nabla v(x)\|^2 + M(x)}, 0\right), \tag{14}$$

in the convex combination given be equation 12.

After halos may be reduced or removed from the image, noise may be added to the image at 214. For example, the noise removed by the pre-filter module 204 may be combined with the output of the halo removal to generate an output image. The output image may be a deblurred image.

In one implementation, the image processing system 202 of FIG. 2 may be integrated in a mobile device and may deblur a 12 MP image in approximately a fraction of a second using the techniques described herein. For example, the image processing system 202 may be designed for ×86 and ARM architectures using the programming language of Halide. Halide may separate the algorithm implementation from its execution schedule (i.e., loop nesting, parallelization, . . . ) to enable the fuse pipeline stage for locality to be more easily fused and to make use of a Single Instruction-stream Multiple Data-stream (SIMD) computer architecture and thread parallelism. The algorithm may run in parallel and a parallel implementation may take full advantage of the parallel processing power of any suitable GPU.

In this implementation, a pre-filter step separating noise-like structure from the rest of the image may be applied. If the input image is very noisy or has compression artifacts, this pre-filtering step will avoid the blur removal process to amplify artifacts present in the image. Since the residual image is added at the end, this step may not need to be carried out by a state-of-the-art denoiser.

The image processing system 202 may estimate the blur of the image. First, the image is normalized using quantiles (q=0:0001 and 1−q) to be robust to outliers. From the image gradient ($u_x$; $u_y$), the directional derivative may be computed at n angles (usually $n_{angles}$=6) uniformly covering [0; ¶]. The maximum direction of the magnitude for each angle may be found. Among the $n_{angles}$ maximum values, the minimum value and angle (f0; _0) may be found through bicubic interpolation of (f1; 1); : : : ; (fn; n) in a super-resolve grid (n samples). Using Equation 10, $\sigma_0$ and $\sigma_1$ may be compute and the p may be computed.

In this case, the gradient features may be efficiently computed in parallel not just between different angles but also between each different pixels. Computing the maximum can be represented as a gather operation that can be optimized using shared memory and tiling. Within the pipeline, this represents around 40-53% of the computation since the maximum magnitude may be calculated $n_{angles}$ times.

Further, the deblurring filter of the image processing system 202 may have a closed form given by the estimated blur and the polynomial coefficient of Equation 8 above. In the case of a third order polynomial filter, the restoration filter support is roughly three times the one of the estimated base blur. For large blur kernels, convolutions can be efficiently computed in Fourier domain. If the Gaussian blur is separable, the convolution can be efficiently computed in space. In this case, the polynomial filter may not be computed. Rather, repeated applications of the Gaussian blur may be directly applied and accumulated as follows:

$$r_0 = a_0 u, u_i = k^* u_{i-1} + a_i u. \tag{11}$$

Non-separable Gaussian filtering can be also efficiently computed by two 1D Gaussian filters in non-orthogonal axis.

Figure 3:
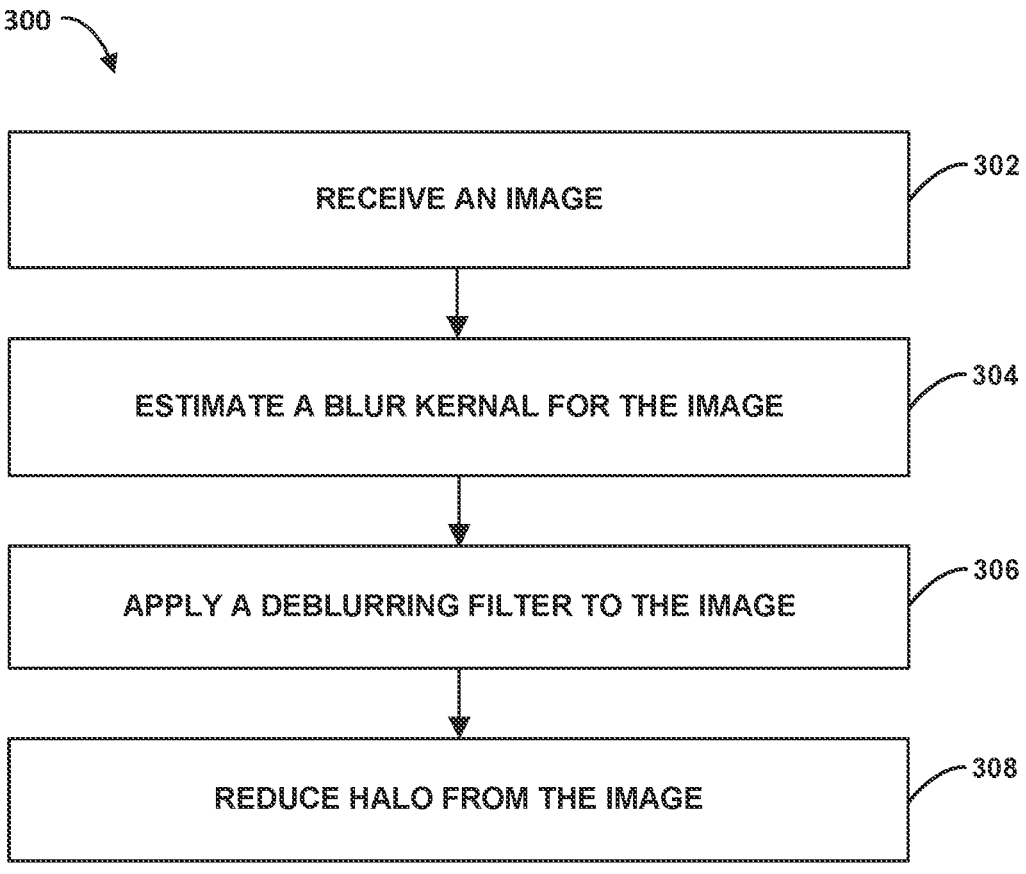
FIG. 3 depicts an illustrative flow diagram of an example method, in accordance with an example embodiment.

Referring again to the drawings, FIG. 3 illustrates example aspects of a method 300 for removing blur from an image. The method 300 represents an example method that may include one or more operations as depicted by one or more blocks 302-308, each of which may be carried out by any of the embodiments shown in FIGS. 1 and 2, among other possible embodiments. In an example implementation, a computing device or image processing system (e.g., the computing device 100 of FIG. 1 or the image processing system 200 of FIG. 2) performs the illustrated operations, although in other implementations, one or more other systems can perform some or all of the operations.

Those skilled in the art will understand that the flow diagrams or charts described herein illustrates functionality and operations of certain implementations of the present disclosure. In this regard, each block of the flow diagrams may represent a module, a segment, or a portion of program code, which includes one or more instructions executable by one or more processors for implementing specific logical functions or steps in the processes. The program code may be stored on any type of computer readable medium, for example, such as a storage device including a disk or hard drive.

In addition, each block may represent circuitry that is wired to perform the specific logical functions in the processes. Alternative implementations are included within the scope of the example embodiments of the present application in which functions may be executed out of order from that shown or discussed, including substantially concurrent or in reverse order, depending on the functionality involved, as would be understood by those reasonably skilled in the art. Within examples, any system may cause another system to perform one or more of the operations (or portions of the operations) described below.

Referring now to FIG. 3, the method 300 may be used to improve images received from an image capture device, such as a camera. For example, the method 300 performs a blur removal process to estimate blur for an image and removes the blur from the image. In one example, an image processing system, such as the image processing system illustrated in FIG. 2, may be used to perform the blur removal process illustrated in FIG. 3. The image processing system may implemented by or integrated with a camera, a mobile device, a personal computer system, a desktop computer, a laptop, a notebook, a netbook computer, a mainframe computer system, a handheld computer, a work-station, a network computer, a set top box, a mobile phone, a video game console, a handheld video game device, an application server, a storage device, a wearable computing device (e.g., a pair of eye glasses equipped with a camera, a head-mounted display, and/or an augmented reality display), a peripheral device such as a switch, modem, router, or in general any type of computing or electronic device, etc.

At block 302, an image may be received the image processing system. The input image may be optionally preprocessed. Preprocessing may include image brightness normalization and a determination of the dynamic range and noise estimation. Images having a high degree of noise may be rejected. In some examples, the input images are passed through a filter (e.g., a non-local means filter) to reduce noise in the image. In other embodiments, the image processing system can use other noise removal techniques to generate a noise-reduced image. In some examples, the noise removal techniques can include AIM Engine Denoise-Upscale-Downscale, a neural network, median filtering, Anisotropic diffusion, geometric mean filtering, local means filtering, bilateral filtering, block-matching and three-dimensional (3D) filtering, local pixel grouping, filtering using a Wiener filter, any combination thereof, and/or any other suitable noise filtering technique.

Further, the image processing system may perform operations for normalizing the image and determining dynamic range of the image. For example, the image processing system may normalize the brightness of the input image such that processed images have predefined contrast and standard deviation values. The image processing system may additionally determine whether to perform the blur detection processing based on the dynamic range and noise in the image. If the image has too much noise or too low of a dynamic range, the image processing system may be configured to discard the image. If the image processing system determines that the blur detection processing may be performed, further processing steps may be performed to remove the blur from the image.

At block 304, the image processing system may estimate the blur of the image. In one example, the image processing system may normalize input image, compute image gradient features, interpolate the gradient features, and estimate parameters of a Gaussian function (e.g., $\sigma_0$ and $\sigma_1$) using a regression model as described above. Further, the image processing system may compute a blur score for the image that indicates the extent of blurriness. The blur score may be compared to a predetermined threshold. If the blur score is less than the predetermined threshold, it may be determined that the image is of good/acceptable quality and the image processing system may continue to process the image. If, on the other hand, it is determined that the blur score is greater than the threshold, the image may be discarded.

At block 306, the image processing device may deblur the image based on the estimated blur. The image processing device may apply a deblurring filter (e.g., a linear restoration filter) to the image to reduce the blur. The deblurring filter may be constructed based on the inverse of the blur estimated by the image processing system. In one example, the inverse can be approximated with a polynomial filter using the blur kernel as a base as described above.

At block 308, the image processing device may reduce halo from the image. The image processing device may reduce halos by using equation (14) above. After halos are reduce or removed from the image, noise may be added to the image at 214. For example, the noise removed by the pre-filter step be combined with the output of the halo removal step to generate an output image. The output image may be a deblurred image.

It will be appreciated that the steps shown in FIG. 3 are meant to illustrate a method in accordance with example embodiments. As such, various steps could be altered or modified, the ordering of certain steps could be changed, and additional steps could be added, while still achieving the overall desired operation. The method can be performed by a client device, or by a server, or by a combination of a client device and a server. The method can be performed by any suitable computing device(s).

An illustrative embodiment has been described by way of example herein. Those skilled in the art will understand, however, that changes and modifications may be made to this embodiment without departing from the true scope and spirit of the elements, products, and methods to which the embodiment is directed, which is defined by the claims.

FIG. 4 is a schematic diagram of a computer program, according to an example implementation. In some implementations, the disclosed methods may be implemented as computer program instructions encoded on a non-transitory computer-readable storage media in a machine-readable format, or on other non-transitory media or articles of manufacture.

In an example implementation, computer program product 400 is provided using signal bearing medium 402, which may include one or more programming instructions 404 that, when executed by one or more processors may provide functionality or portions of the functionality described above with respect to FIGS. 1-3. In some examples, the signal bearing medium 402 may encompass a non-transitory computer-readable medium 406, such as, but not limited to, a hard disk drive, a CD, a DVD, a digital tape, memory, components to store remotely (e.g., on the cloud) etc. In some implementations, the signal bearing medium 402 may encompass a computer recordable medium 408, such as, but not limited to, memory, read/write (R/W) CDs, R/W DVDs, etc. In some implementations, the signal bearing medium 402 may encompass a communications medium 410, such as, but not limited to, a digital and/or an analog communication medium (e.g., a fiber optic cable, a waveguide, a wired communications link, a wireless communication link, etc.). Similarly, the signal bearing medium 402 may correspond to a remote storage (e.g., a cloud). A computing system may share information with the cloud, including sending or receiving information. For example, the computing system may receive additional information from the cloud to augment information obtained from sensors or another entity. Thus, for example, the signal bearing medium 402 may be conveyed by a wireless form of the communications medium 410. The one or more programming instructions 404 may be, for example, computer executable and/or logic implemented instructions. In some examples, a computing device such as the computing device 100 of FIG. 1 and the image processing system 202 of FIG. 2 may be configured to provide various operations, functions, or actions in response to the programming instructions 404 conveyed to the computing device by one or more of the computer readable medium 406, the computer recordable medium 408, and/or the communications medium 410.

The non-transitory computer readable medium could also be distributed among multiple data storage elements and/or cloud (e.g., remotely), which could be remotely located from each other. The computing device that executes some or all of the stored instructions could be another computing device, such as a server.

Example methods, systems, and apparatus are described herein in accordance with one or more aspects associated with deblurring images. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-Specific Integrated Circuits (ASICs), Application-Specific Standard Products (ASSPs), System-on-a-Chip systems (SoCs), or Complex Programmable Logic Devices (CPLDs).

Further, the above detailed description describes various features and operations of the disclosed systems, apparatus, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
receiving, by a processing device, an image;
computing, by the processing device, gradient features of the image, wherein computing the gradient features comprises computing a directional derivative at each of a plurality of angles;
estimating, by the processing device, blur for the image based on the gradient features, wherein estimating the blur based on the gradient features comprises estimating a plurality of parameters of an anisotropic Gaussian function based on the gradient features;
applying a deblurring filter to the image, wherein the deblurring filter is constructed based on the estimated blur; and
reducing halo from the image.

2. The method of claim 1, further comprising removing noise from the image.

3. The method of claim 1, wherein estimating the blur based on the gradient features further comprises estimating a blur kernel based on the gradient features.

4. The method of claim 3, further comprising estimating an inverse of the blur with a polynomial based on the blur kernel, wherein the deblurring filter is constructed based on the polynomial.

5. The method of claim 4, wherein the polynomial is a third order polynomial that includes a plurality of design parameters.

6. The method of claim 5, wherein the plurality of design parameters includes a design parameter that controls mid-frequency amplification.

7. The method of claim 5, wherein the plurality of design parameters includes a design parameter that controls noise amplification.

8. The method of claim 3, wherein the deblurring filter comprises a polynomial filter based on the blur kernel.

9. The method of claim 8, wherein the polynomial filter is based on an inverse of the estimated blur.

10. The method of claim 1, wherein estimating the plurality of parameters of the anisotropic Gaussian function based on the gradient features comprises estimating three parameters of the anisotropic Gaussian function based on the gradient features.

11. The method of claim 1, further comprising normalizing the image.

12. The method of claim 1, further comprising computing a maximum magnitude of the directional derivative for each of the plurality of angles.

13. The method of claim 12, further comprising selecting a minimum value from the maximum magnitudes of the directional derivatives, wherein the blur is estimated using the minimum value.

14. The method of claim 1, further comprising estimating a blur score for the image, the blur score indicative of the extent of blurriness in the image.

15. The method of claim 14, further comprising comparing the blur score to a threshold value.

16. The method of claim 1, wherein the deblurring filter comprises a linear restoration filter constructed from the estimated blur.

17. An apparatus comprising:
memory; and
one or more processors configured to:
receive an image;
compute gradient features of the image, wherein computing the gradient features comprises computing a directional derivative at each of a plurality of angles;
estimate a blur for the image based on an anisotropic Gaussian function, wherein the anisotropic Gaussian function includes a plurality of parameters based on the gradient features;
apply a deblurring filter to the image, wherein the deblurring filter is constructed based on the estimated blur; and
reduce halo from the image.

18. The apparatus of claim 17, wherein the deblurring filter comprises a polynomial filter.

19. A non-transitory computer-readable medium storing instructions, the instructions being executable by one or more processors to perform functions comprising:
receiving an image;
computing gradient features of the image, wherein computing the gradient features comprises computing a directional derivative at each of a plurality of angles;
estimating a blur for the image based on the gradient features, wherein estimating the blur based on the gradient features comprises estimating a plurality of parameters of an anisotropic Gaussian function based on the gradient features;
applying a deblurring filter to the image, wherein the deblurring filter is constructed based on the estimated blur; and
reducing halo from the image.

20. The non-transitory computer-readable medium of claim 19, wherein the deblurring filter comprises a polynomial filter.

* * * * *